(12) United States Patent
Wilson et al.

(10) Patent No.: US 7,302,697 B1
(45) Date of Patent: Nov. 27, 2007

(54) BROADCAST PAUSE AND RESUME FOR ENHANCED TELEVISION

(75) Inventors: Andrew T. Wilson, Portland, OR (US); David B. Kinder, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/491,787

(22) Filed: Jan. 26, 2000

(51) Int. Cl.
*H04N 7/173* (2006.01)

(52) U.S. Cl. .......................... 725/110; 386/83; 386/95; 725/112

(58) Field of Classification Search ............. 386/83, 386/95, 124–126; 725/112, 29, 136, 51, 725/32, 146, 39, 109, 110; 348/563, 564
See application file for complete search history.

(56) References Cited

U.S. PATENT DOCUMENTS

| | | | |
|---|---|---|---|
| 5,134,499 A | 7/1992 | Sata et al. | 358/342 |
| 5,479,302 A | 12/1995 | Haines | 360/69 |
| 5,485,553 A * | 1/1996 | Kovalick et al. | 386/96 |
| 5,701,383 A * | 12/1997 | Russo et al. | 386/46 |
| 5,931,908 A * | 8/1999 | Gerba et al. | 709/219 |
| 5,991,799 A * | 11/1999 | Yen et al. | 709/218 |
| 6,134,379 A * | 10/2000 | LaMacchia | 386/54 |
| 6,163,779 A * | 12/2000 | Mantha et al. | 707/100 |
| 6,349,410 B1 * | 2/2002 | Lortz | 725/110 |
| 6,415,438 B1 * | 7/2002 | Blackketter et al. | 725/136 |
| 6,480,667 B1 * | 11/2002 | O'Connor | 386/83 |
| 6,571,392 B1 * | 5/2003 | Zigmond et al. | 725/110 |
| 6,580,870 B1 * | 6/2003 | Kanazawa et al. | 386/95 |
| 6,591,058 B1 * | 7/2003 | O'Connor et al. | 386/65 |
| 2002/0007493 A1 * | 1/2002 | Butler et al. | 725/109 |

FOREIGN PATENT DOCUMENTS

| | | |
|---|---|---|
| EP | 0 808 072 A2 | 11/1997 |
| EP | 0942595 A2 * | 3/1999 |
| WO | WO 98/48566 | 10/1998 |
| WO | WO 00/36823 | 6/2000 |
| WO | WO 01/11874 | 2/2001 |

OTHER PUBLICATIONS

"Hitachi Plans Flexible DVD Video Recorder", Electronic Engineering Times, p. 8, Jun. 16, 1997.
Jim B. Estipona, "Enhanced Television Recorder and Player", U.S. Appl. No. 09/579,244, filed May 25, 2000.

* cited by examiner

*Primary Examiner*—Vincent F. Boccio
(74) *Attorney, Agent, or Firm*—Schwabe, Williamson & Wyatt, P.C.

(57) ABSTRACT

A broadcast pause and resume system may enable replay from a random access memory of video information received from a video distribution source such as cable, broadcast television or satellite distribution as examples. Key frames may be stored which enable the replay from the memory of both video and enhanced content. In some embodiments of the present invention, a reference to stored enhanced content may be stored instead of storing the entire contents of a browser cache.

30 Claims, 12 Drawing Sheets

BROADCAST PAUSE AND RESUME FOR ENHANCED TELEVISION

BACKGROUND

This invention relates to the recording and playing back of a video stream. A video stream includes any combination of audio and/or video data streams.

Video streams have typically been recorded on analog media such as a video cassette. A video cassette recorder (VCR) is used to record the video stream on the video cassette. The video stream may arrive via a broadcast signal, via cable, via satellite signal, or from another video playback device. Once the video stream has been recorded, the VCR is used to rewind the recording medium and play what was recorded. However, due to the nature of the analog medium, once the VCR has started recording, it is not possible to play back the portion of the video stream that has already been recorded until the recording session is terminated.

Ancillary information, such as program sub-titles, emergency messages, closed caption messages, and program guide information, may be transmitted along with regular television content. More recently, other types of ancillary information that may be sent with television content include enhancement data such as Web pages, multimedia information, or other digital data files. Ancillary information may be sent in the vertical blanking interval (VBI) of an analog television broadcast signal or may be sent with digital television content over a digital transmission transport medium.

Various standards exist that provide for transmission of ancillary information along with television content. One standard is the Advanced Television Enhancement Forum (ATVEF) Specification, Draft Version 1.1r26, dated Feb. 2, 1999. The ATVEF specification provides for transmission of enhancement data along with television content in both analog and digital systems, such as cable systems, satellite systems, terrestrial systems, and so forth.

There is a need for an improved way of recording portions of a video transmission containing enhanced content.

DETAILED DESCRIPTION

Figure 1:
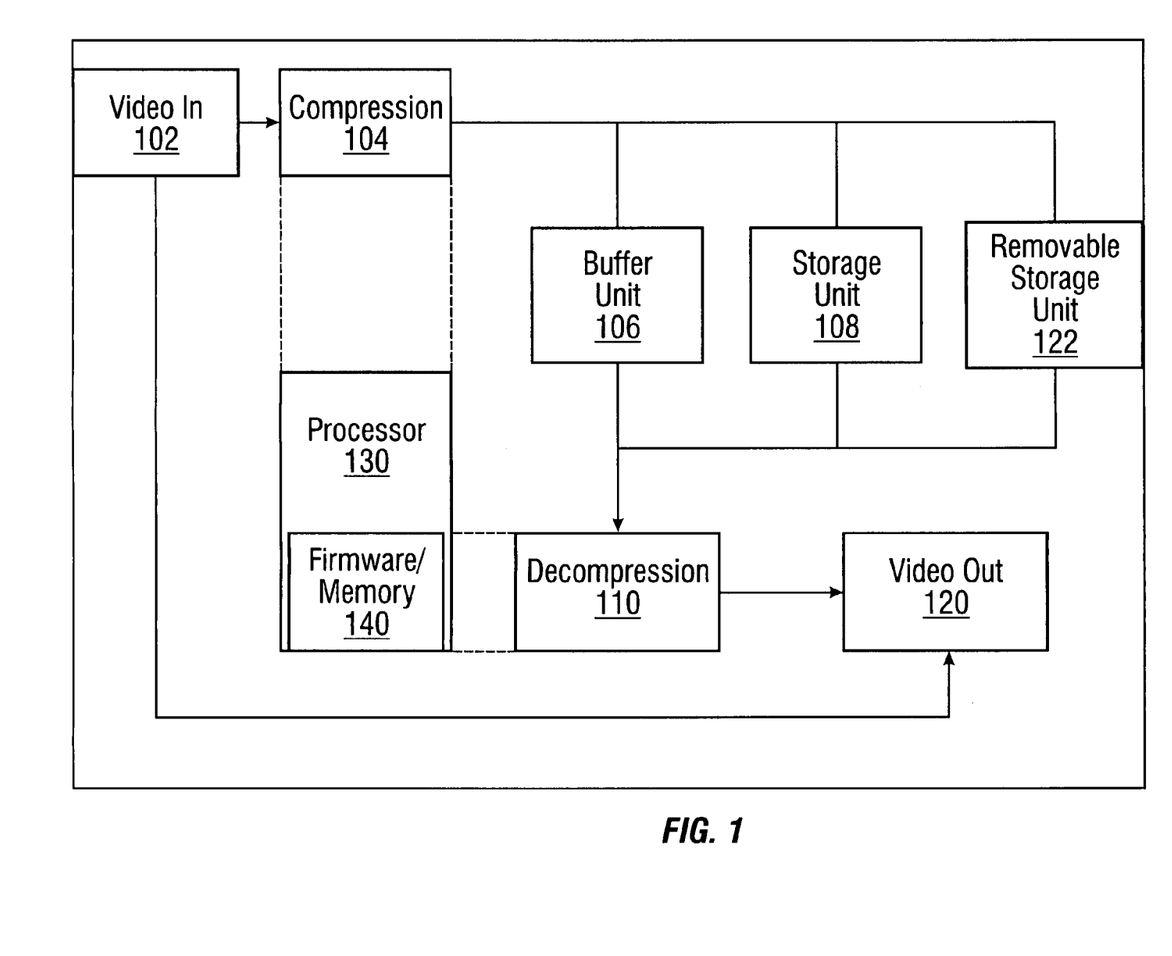
FIG. 1 is a block diagram of a video record and playback system in accordance with one embodiment of the invention.

A video record and playback system 100, in accordance with one embodiment of the invention shown in FIG. 1, receives a video stream at the video input port 102. The video stream may be provided by a camera, a television signal, broadcast, cable, or satellite signals, or another video playback device. In one embodiment, an analog-to-digital conversion may be performed on an analog video stream to form a digital video bit stream. In a different embodiment, the video is already in digital form. The video record and playback system 100 may be part of a system, such as a computer system or set top box, such that the video input port 102 may be part of a video capture card in the computer system or set top box.

The digital video stream from the video input port 102 is optionally compressed at compression unit 104. In one embodiment, the video is already compressed and no further compression is needed. The video stream is then stored in the storage unit 108. A buffer unit 106 may be used as temporary storage for providing larger sequential blocks of video data to the storage unit 108. In one embodiment, the buffer unit 106 comprises a random access memory that allows relatively quick access to any portion of the stored video stream.

The video stream is played back by reading the video stream from the storage unit 108. If the video stream was compressed in compression unit 104, then a decompression unit 110 decompresses the retrieved video stream. The video stream is provided from a video output port 120, to a monitor or other display device such as a TV to provide sound and/or video to a user.

A removable storage unit 122 may also be included in video record and playback system 100, Examples of removable storage units include a writeable compact disk read only memory (CD-ROM), writeable digital video disk (DVD), a flash memory, or another hard disk. The availability of a removable storage unit 122 allows a user to transfer a recording of a video stream stored in storage unit 108 to the removable storage unit 122 and then to transfer the unit 122 to another system at a different location.

In one embodiment, a processor 130 controls the operations of the video record and playback system 100. The compression unit 104 and decompression unit 110 may be implemented in hardware, or the compression and decompression functions of units 104 and 110 may be performed by the processor 130. Processor 130 receives instructions from firmware/memory 140, using technology that is well known.

Figure 2:
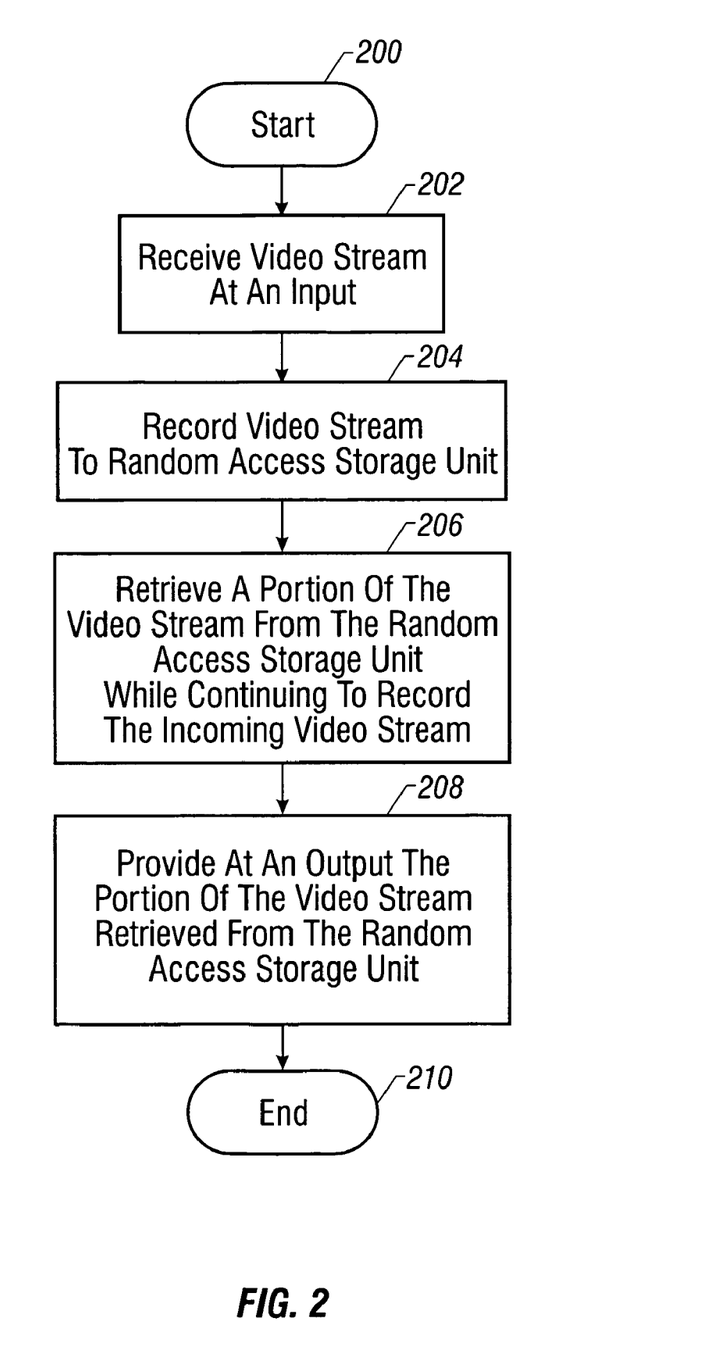
FIG. 2 is a flow chart of one embodiment of the method of providing a time-shifted video stream in accordance with the invention.

FIG. 2 shows a flow chart of an embodiment of a method of providing a time-shifted video stream in accordance with one embodiment of the present invention. The flow chart begins at block 200, and continues at block 202 where the video stream is received. The recording of the video stream begins at block 204. At block 206, playback of the recorded video stream is performed by retrieving a portion of the video stream from the random access storage unit while the recording of the incoming video stream continues. The retrieved portion of the video stream may be time-shifted from the incoming video stream by a time delay. At block 208, the portion of the video stream retrieved from the random access storage unit is retrieved for display by a television or other display device.

In this way, the record and playback functions are decoupled from one another. The user may now begin watching a recorded TV show from the beginning, e.g., prior to the show being completely recorded.

Figure 3:
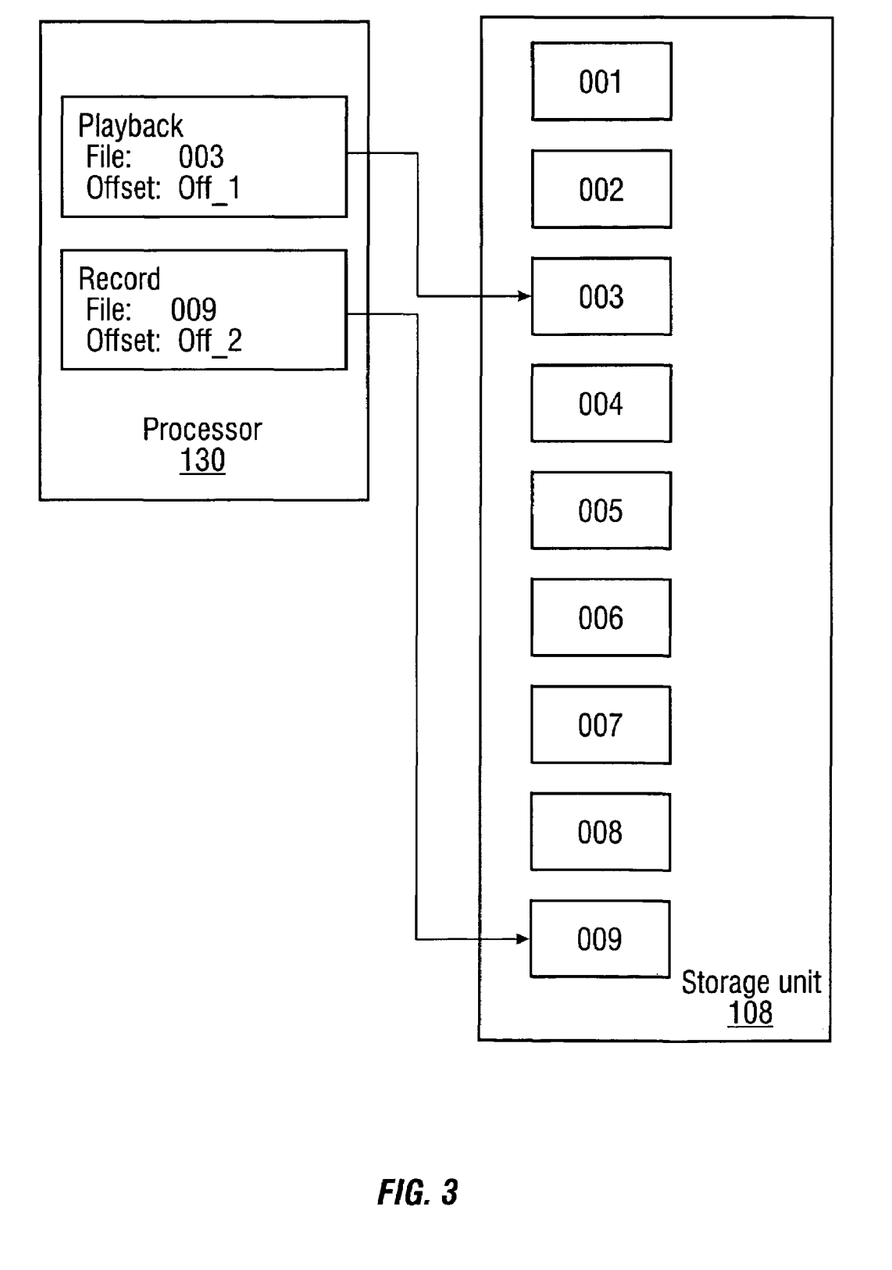
FIG. 3 shows one embodiment of an apparatus for storing the video stream on a hard disk in accordance with the invention.

FIG. 3 shows one embodiment of an apparatus for storing the video stream in the storage unit 108 in accordance with one embodiment of the invention. Again, the invention is not restricted in scope to the illustrated embodiments. In this embodiment, the video stream is stored as separate files 001 and 009 on a hard disk, for example. The processor 130 keeps track of the file and offset into the file of the data being played back, as well as the file and offset into the file of the data being recorded. If the random access storage unit is fast enough, more than one video stream may be recorded and played back at the same time.

Figure 4:
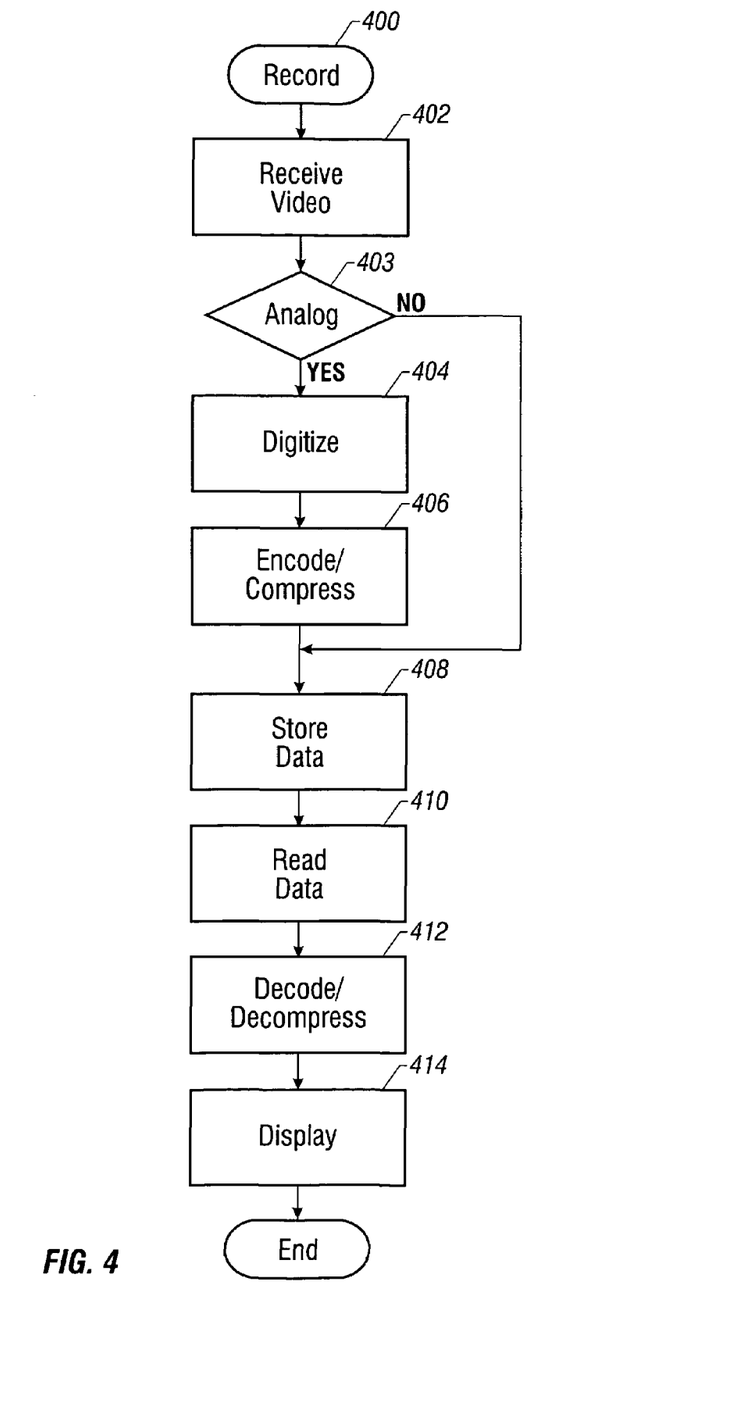
FIG. 4 is a flow chart showing one embodiment of a system for recording and playing back a video stream in accordance with the invention.

Referring now to the embodiment shown in FIG. 4, a flow chart 400 for digitally recording a video stream in accordance with one embodiment of the invention begins by receiving the video stream as indicated in block 402. If the stream is an analog stream (diamond 403), it may be digitized in an analog-to-digital conversion process as indicated at block 404. Next the digital stream may be encoded and compressed, for example using a compression scheme, as indicated in block 406. The stream is alternately read, as indicated at block 410, and stored, as indicated in block 408, in a conventional storage device such as a hard disk drive, a digital video disk or a flash memory. Data that is read from the storage device may be decoded and decompressed using conventional technology, for example, as indicated in block 412, for display as indicated in block 414.

Figure 5:
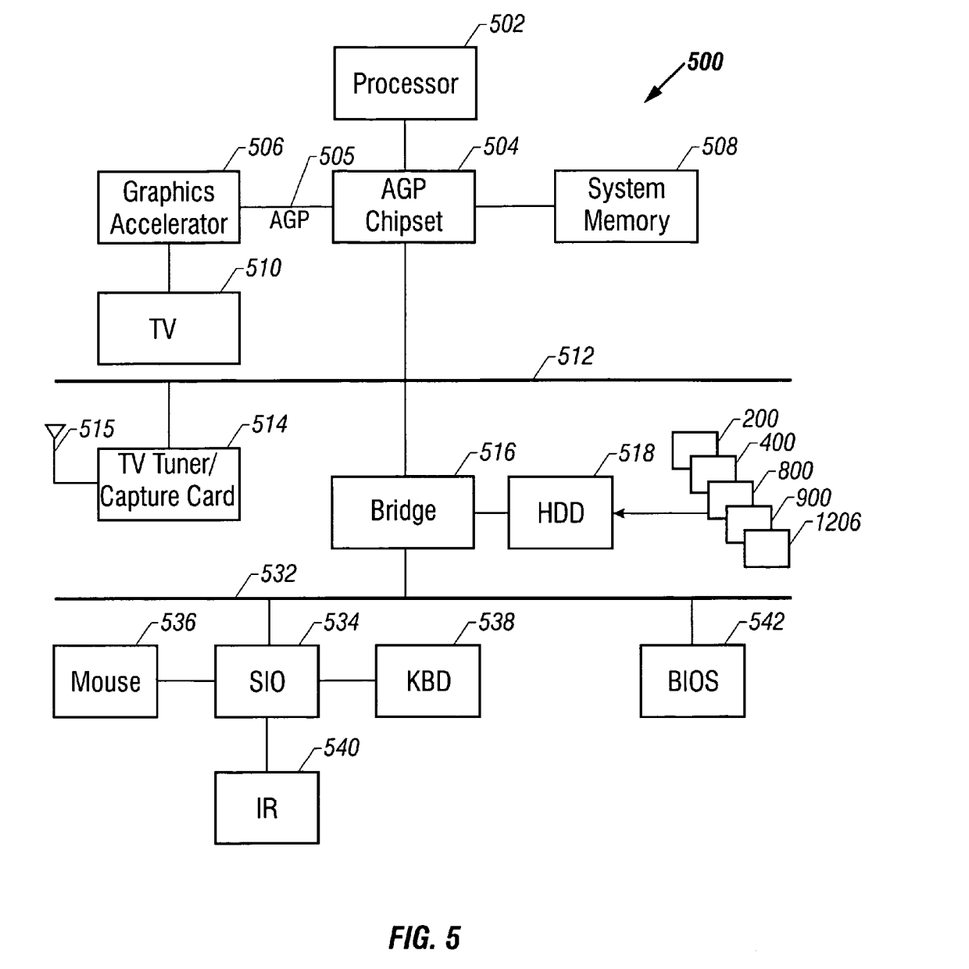
FIG. 5 is a block diagram of a computer system useful in implementing one embodiment of the present invention.

A system 500 in accordance with one embodiment of the present invention, shown in FIG. 5, includes a processor 502. In one embodiment, the processor may be coupled to an accelerated graphics port (AGP) chipset 504 for implementing an accelerated graphics port embodiment. The chipset 504 communicates with the AGP port 505 and the graphics accelerator 506. The television 510 may be coupled to the video output of the graphics accelerator 506. The chipset 504 accommodates the system memory 508. The chipset 504 is also coupled to a bus 512 which may be, for example, a peripheral component interconnect (PCI) bus (PCI Local Bus Specification, Version 2.2 dated Jun. 1, 1998). The bus 512 couples to a TV tuner/capture card 514 which is coupled to an antenna 515 or other video input port, such as a cable input port, a satellite receiver/antenna or the like. The TV tuner and capture card 514 selects a desired television channel and also performs the video capture function (block 402, FIG. 4). One example of video capture card is the ISVR-III video capture card available from Intel Corporation.

The bus 512 is also coupled to a bridge 516 which couples a hard disk drive 518. The software 200, 400, 900, 1206 and 1300 may be stored on the hard disk 518. The bridge 516 is also coupled to another bus 532. The bus 532 may be coupled to a serial input/output (SIO) device 534. The device 534 is in turn coupled to conventional components such as a mouse 536, a keyboard 538, and an infrared interface 540. Also coupled to the bus 532 is a basic input/output system (BIOS) 542.

Figure 6:
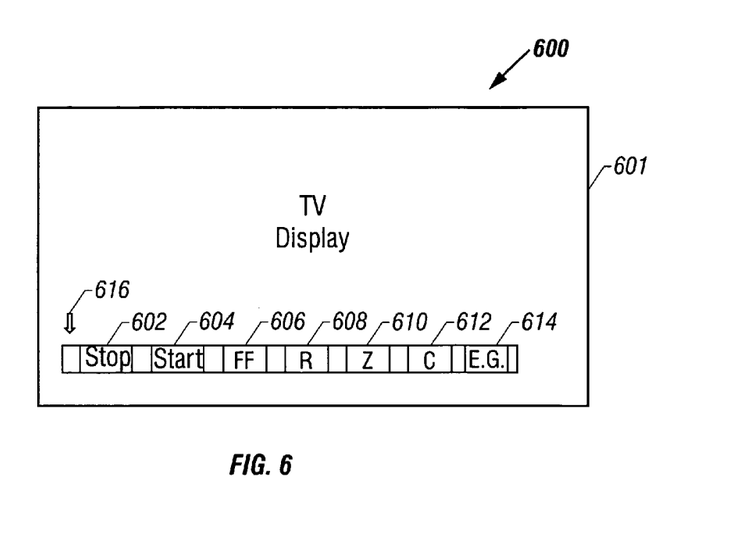
FIG. 6 is an exemplary TV display for implementing an embodiment of the present invention.

An example of a display 600, shown in FIG. 6, for the television 510 may display a conventional television picture or program 601 and, in addition, may have superimposed over the screen, in a discrete fashion, a mouse selectable series of icons, such as the icons 602 through 614. When the mouse cursor 616 selects the appropriate one of the icons, a corresponding feature may be implemented. Among the features that may be implemented in this fashion include a pause or stop function 602, a start record function 604, a fast forward function 606, a rewind function 608, and a 10 second replay function 610 which winds back 10 seconds (or some other amount) and replays, and a catchup function 612 that begins playing back recorded content at a faster than normal rate until the display catches up with a live broadcast and an electronic program guide 614. The above described functions 602, 604, 606, 608, 610, and 612 may also be individual buttons on a remote control unit.

Figure 7:
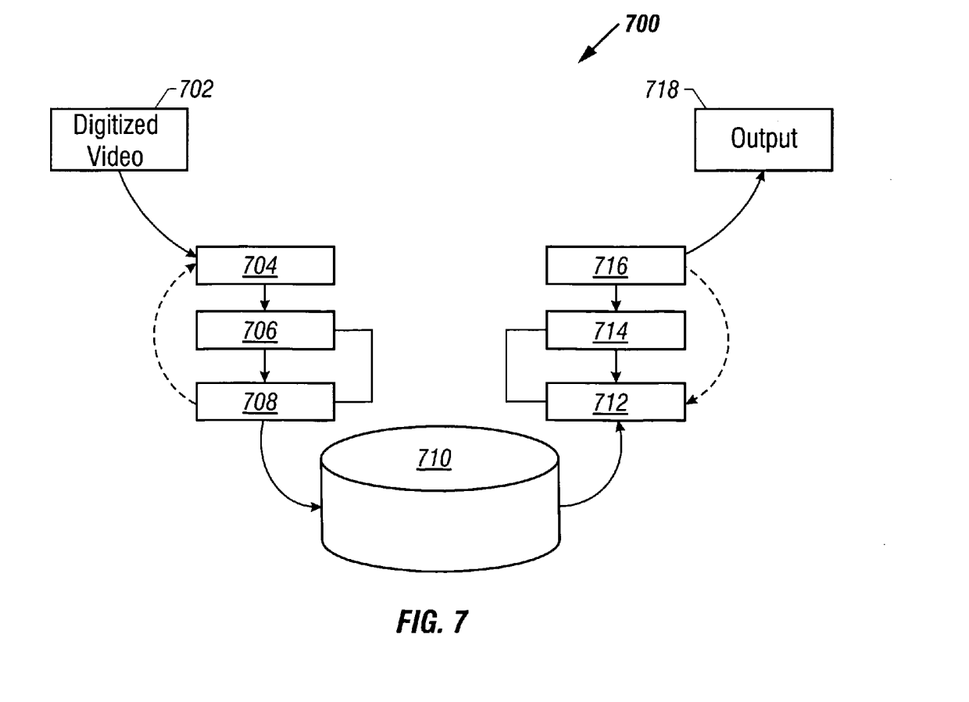
FIG. 7 is a block diagram showing how data is transferred to and from a memory device in accordance with one embodiment of the present invention.

Techniques for storing the video stream onto the storage device 710 and for reading the information out of the storage device are summarized in Table 1 below and illustrated in FIGS. 7, 8, and 9. In FIG. 7, a schematic depiction of the storage system 700 includes a digital storage device such as a hard disk drive 710. The digitized video 702 is initially stored in a buffer which is designated as being currently on the top of the memory stack. The transfer of information between the buffers and the storage device 710 may be done in discrete time periods referred to herein as time steps.

TABLE 1

| Buffers | Time Steps | | | | | | | | |
|---|---|---|---|---|---|---|---|---|---|
| | 1 | 2 | 3 | 4 | 5 | 6 | 7 | 8 | 9 |
| Input Storage | 704 | 708 | 706 | 704 | 708 | 706 | 704 | 708 | 706 |
| Read | X | X | X | 712 714 | X | 714 716 | X | 712 716 | X |
| Write | X | X | 704 708 | X | 704 706 | X | 706 708 | X | 704 708 |
| Output | X | X | X | X | 714 | 712 | 716 | 714 | 712 |

(X = no action)

Figure 8:
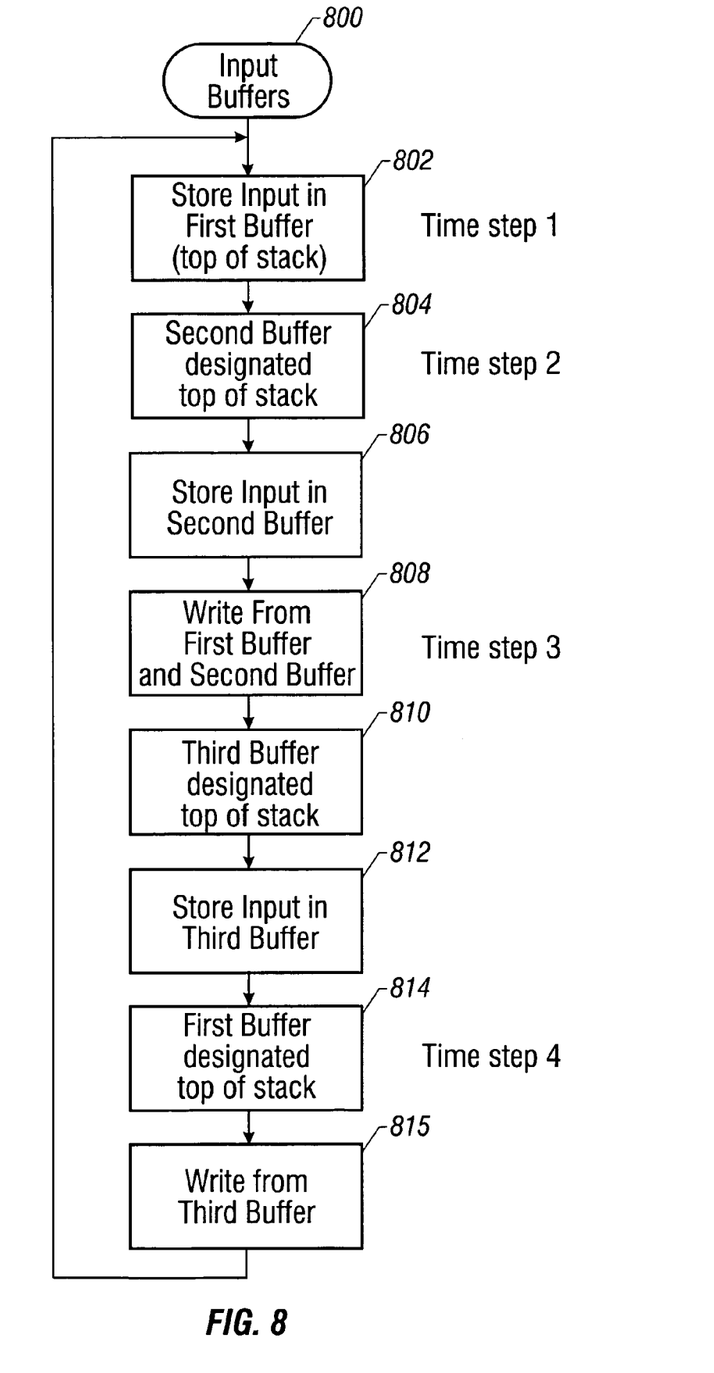
FIG. 8 is a flow chart showing the flow of input video information into a storage device in accordance with one embodiment of the present invention.

In a first time step, shown in FIG. 8, the digitized video 702 (FIG. 7) is stored in memory buffer 704 because that buffer is currently at the top of the memory stack, as indicated in block 802 in FIG. 8.

As the buffer 704 fills up, the buffer 708 moves to the top of the stack (as indicated by the dashed arrow) and incoming video is stored in buffer 708. As indicated in block 804 in FIG. 8 in time step 2, the buffer 708 replaces the buffer 704 as the designated top of the stack buffer. The next input video is then stored in the new buffer (708) as indicated in block 806.

In time step 3 the buffer 708 has filled up and the contents of buffers 704 and 708 are written to the storage device 710 in a single write operation. During the same time step, buffer 706 moves to the top of the stack and becomes the storage buffer for incoming video. This is illustrated in blocks 808, 810 and 812 in FIG. 8.

In time step 4, the buffer 704 moves back to the top of the stack to store incoming video since its previous content has already been saved in the storage device 710. This is indicated in block 814 of FIG. 8. Additionally, in time step 4, the content of buffer 708 is written to the storage device 710 as illustrated in block 815. The storing of incoming information, as illustrated in FIG. 8 then cycles back to the top of the flow in FIG. 8 and continues in the same fashion thereafter.

The content from the storage device 710 is then read into buffers 712 and 714 in time step 4 and block 802.

In time step 5, the buffer 708 moves to the top of the stack to store incoming video, and buffer 714 moves to the top of the output stack and transfers data to the video output 718. The contents of the buffers 704 and 706 are then written to the storage device 710.

The time steps 1 to 5 illustrate a complete cycle from input to output. The remaining sequence of steps repeat starting at step 1 through 4 for the input of data and time steps 4 through 9 repeat for the output of data.

Figure 9:
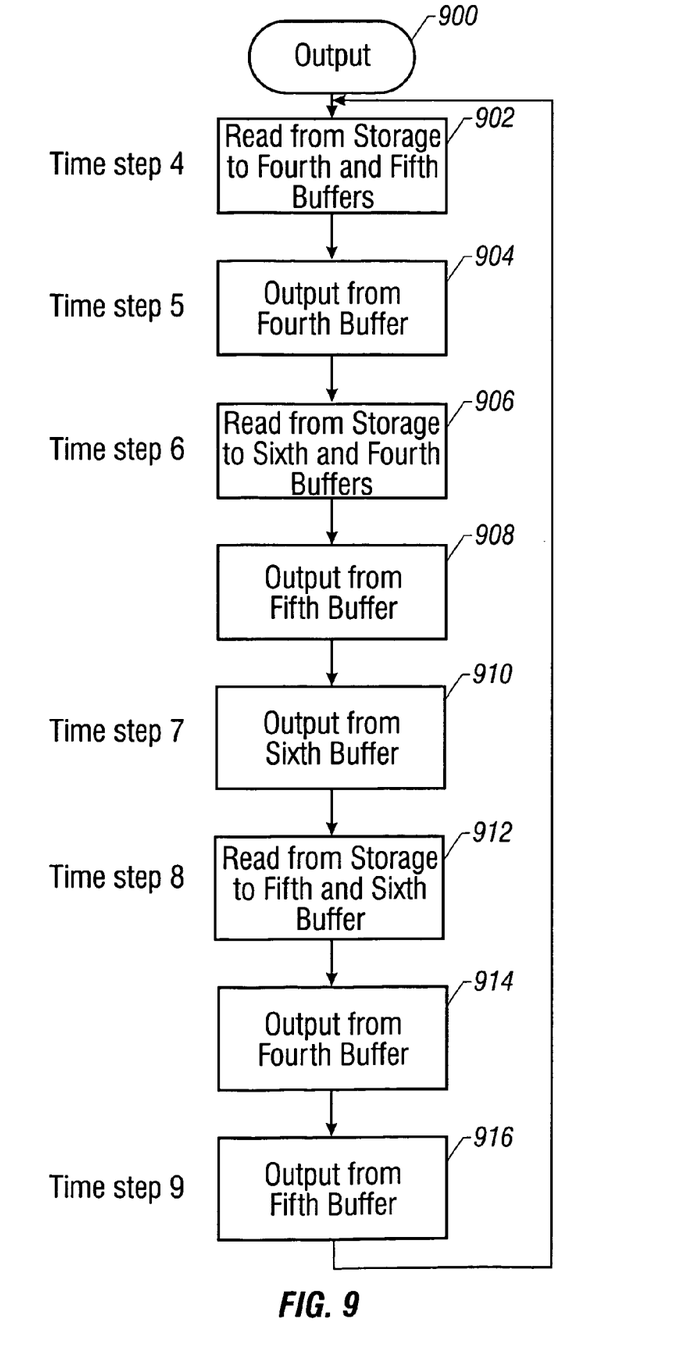
FIG. 9 is a flow chart showing the flow of data from the storage device in accordance with one embodiment of the present invention.

Referring now solely to FIGS. 7 and 9, in time step 6, information stored in the storage device is read to the sixth and fourth buffers (i.e., buffers 714 and 716) as indicated in block 906. The contents of the fifth buffer (712) are sent to the output port 718.

In time step 7, the contents of the sixth buffer (which is buffer 716) are sent to the output port 718. No other output operations occur.

In time step 8, the contents from the storage device 710 are read into the fifth and sixth buffers (buffers 712 and 716) as indicated in block 912. Also the contents of the fourth buffer (buffer 714) are passed to the output port 718 as indicated in block 914.

Finally, during time step 9 the contents of the fifth buffer (buffer 712) are passed to the output port 318, completing the cycle.

Using these techniques, the storage device is provided with enough time, through the operation of the buffers, to write the incoming video while supplying enough data simultaneously to the output display. Since the memory is used to make sure no content is dropped at the input end and the display is never starved at the output end, continuous display can be provided without losing information. In addition reading and writing larger chunks of data at one time reduces the amount of storage device head movement, thereby allowing the storage device to keep up with the read and write requests.

The size of the individual buffers 704 to 708 and 712 to 716 ("B") in megabytes is dependent at least in part on a number of factors including the input/output data rate "D", for example in megabytes per second, the effective bandwidth of the storage device when reading or writing "S", for example in megabytes per second, and the average seek time for the storage device per transaction "t", in microseconds. The time that it takes to fill up one memory buffer (B divided by D) is advantageously greater than the time it takes to read or write two memory buffers (2B divided by S) plus the average seek time (t):

$$\left(\frac{B}{D}\right) \geq \left(\frac{2B}{S}\right) + \left(\frac{t}{1000000}\right)$$

Solving for the minimum buffer size in the above equation yields the following equation which gives the minimum buffer size:

$$B \geq \left(\frac{DS}{S-2D}\right) \times \left(\frac{t}{1000000}\right)$$

Figure 10:
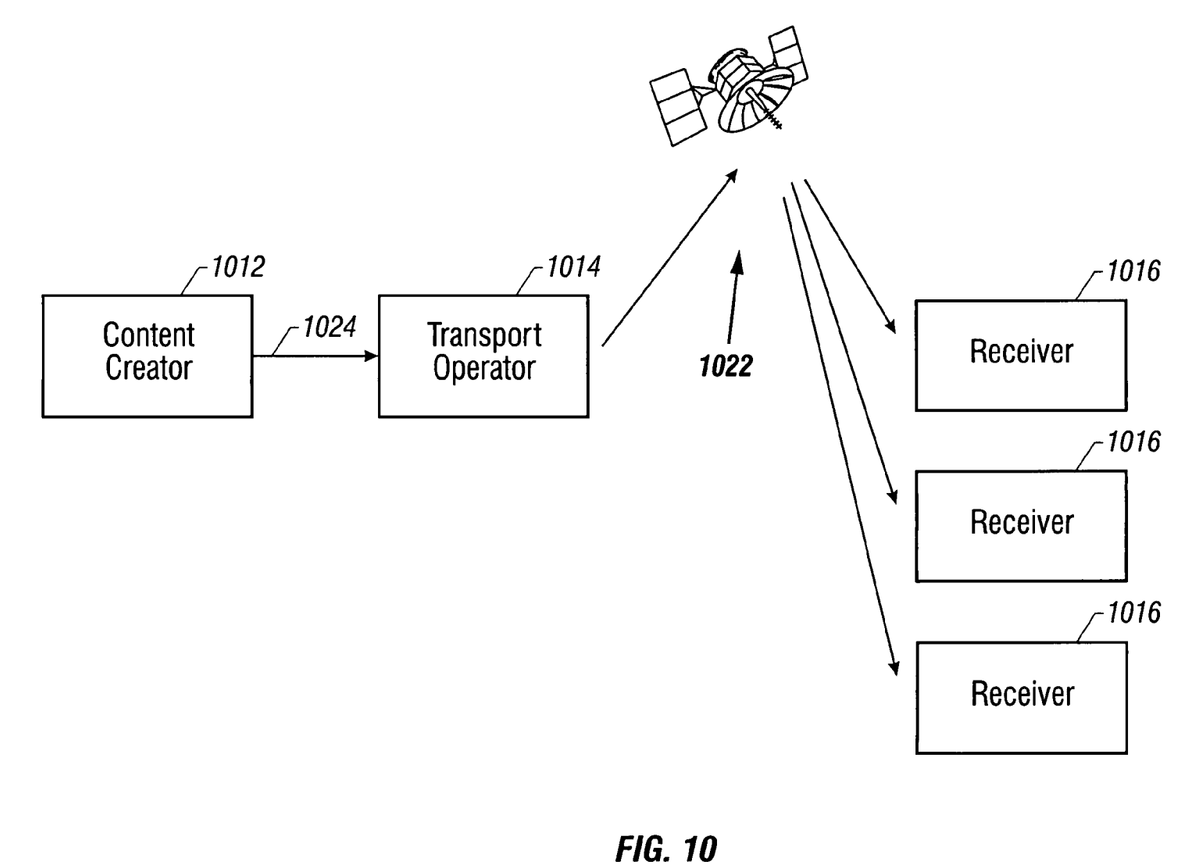
FIG. 10 a schematic depiction of one embodiment of the present invention.

Referring to FIG. 10, an information delivery system 1000 according to one embodiment includes a content creator 1012, a transport operator system 1014, and a plurality of receivers 1016. The receivers 1016 may be located at various receiving sites, including homes, offices, entertainment facilities, or other locations. The content creator 1012 originates enhancement data (or other types of ancillary information) and television content (or other types of content including A/V content) communicated to the transport operator system 1014 over link 1024. Enhancement data may include graphics (e.g., web pages, multimedia information, or other digital data files), presentation layout, and synchronization information. Other types of ancillary information may include program sub-titles, closed caption messages, emergency messages, and program guide information. The combination of the enhancement data or ancillary information and A/V content may be referred to as enhanced content.

The transport operator system 1014 provides an enhanced content delivery infrastructure that may include terrestrial, cable, satellite, or other types of transmission facilities (either analog or digital). The A/V content and enhancement data may be transmitted over a transport medium 1022, which may be a terrestrial, cable, satellite, or other type of link, to the receivers 1016. FIG. 10 illustrates the transport medium 1022 as a satellite link. The receivers 1016 may include televisions, set-top boxes, personal computers, or other types of systems adapted to receive A/V content and associated enhanced content.

Figure 11:
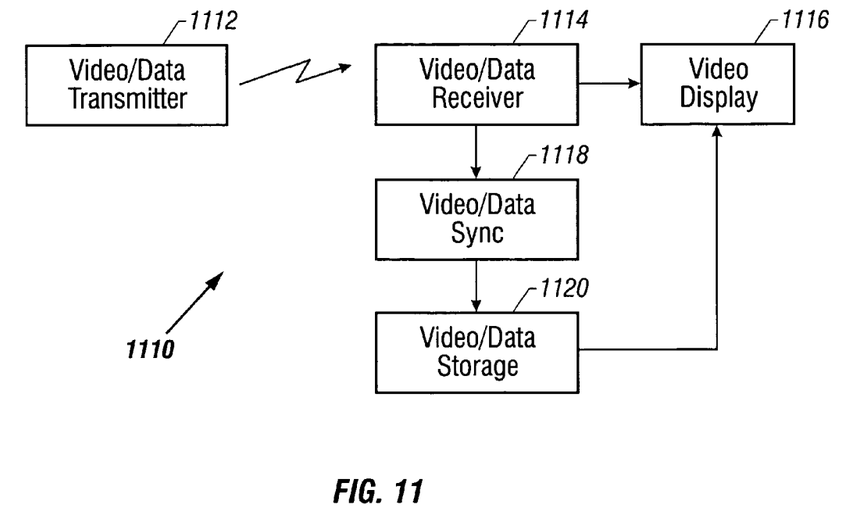
FIG. 11 is a schematic depiction of an embodiment of the present invention with synchronized video and data in accordance with one embodiment of the present invention.

A transmitter 1112 transmits video and enhanced content to a receiver 1114 in accordance with one embodiment of the present invention, as shown in FIG. 11. The video and enhanced content may then be displayed on the display 1116. Alternatively, synchronism can be provided between the enhanced content and the video as indicated at 1118 and both the enhanced content and video may be stored as indicated at 1120.

In the systems which include enhanced content, broadcast pause and resume for time shifted playback may be provided for both the audio and video information and enhanced content. This may mean replaying the enhanced content if the enhanced content was previously activated during the original play or it may mean playing back the original video information and allowing the user, during the replay, to select for viewing the enhanced content.

Random access to selected points within a compressed video stream may be provided through a key frame mechanism in one embodiment of the present invention. A key frame or an intra-coded (I) frame is a complete still frame of video. Other frames, such as the bi-directional (B) or predicted (P) frames, in compressed video are represented as differences from surrounding frames in a Motion Pictures Experts Group (MPEG) system. MPEG-2 refers to International Organization for Standardization (ISO) and International Electrotechnical Commission (IEC) Standard 13818-1 (Systems), 13818-2 (video), 13818-3 (audio) and 13818-4 (compliance) (1994). Since key frames are self contained, it is possible to resume the playback from any key frame in the stream without additional processing.

Figure 12:
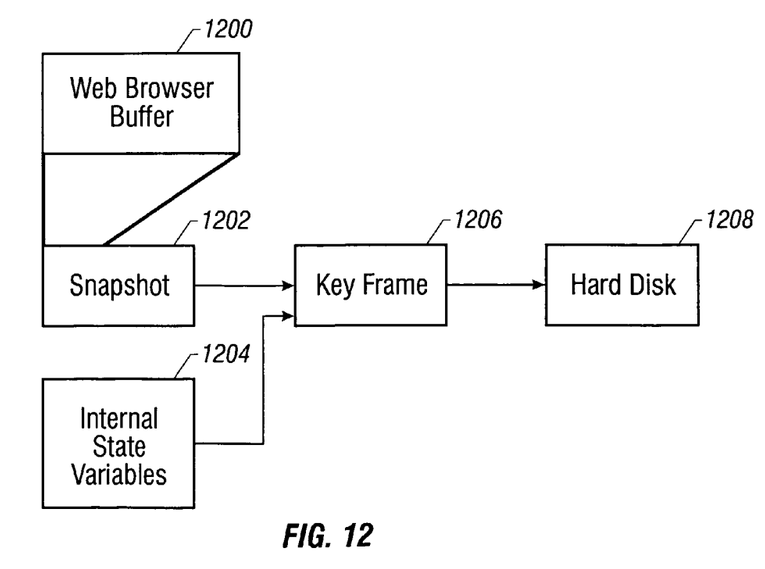
FIG. 12 is a schematic depiction of one embodiment of the present invention implementing a software key frame.

Random access within an arbitrary stream of hypertext mark up language (HTML) commands is difficult. Thus, key frames may be provided to encompass the HTML data and other enhanced content. An instance of the Web browser software may read a received data stream, process the commands, and render the data to an off screen buffer. As shown in FIG. 12, at specified time intervals a snapshot 1202 is taken of the off screen Web browser buffer 1200. The snapshot 1202 may optionally be compressed and stored with the internal state variables 1204 of the browser software to create a software key frame 1206. The software key frame 1206 may then be stored on a hard disk 1208, for example, in synchronization with the A/V content.

As a result, the enhanced content can be played back from any point in the recorded stream. When playback is resumed, the state variables are reloaded into the instance of the browser, and on-screen browser windows are refreshed from the software key frame. Processing of the enhanced video stream can then resume from the indicated point in the video stream.

Figure 13:
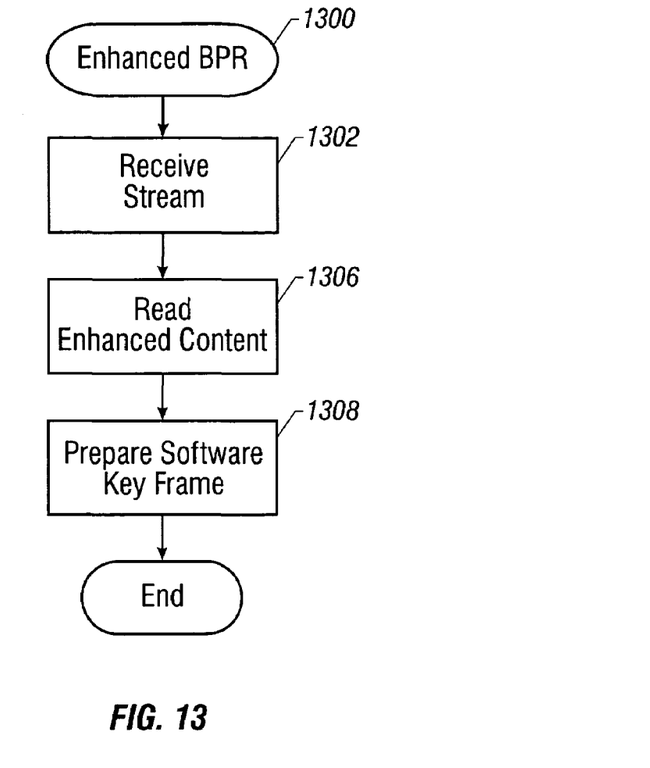
FIG. 13 is a flow chart for a software for implementing one embodiment of the present invention.

In operation, software 1300 may cause the incoming stream, including enhanced content and video information, to be read by the browser as it is received, as shown at block 1302 in FIG. 13. The content is read (block 1306). The browser internal state is the result of reading the enhanced content stream to a certain point. Then, to recreate the state of the stream at a particular time, a software key frame allows reconstruction of the frame without dependencies on what came before or after in the flow (block 1308). The browser has an internal state based on processing commands as received. Thus, an earlier defined point of the browser state may be reloaded upon command from the user.

When the stream is replayed, the enhanced features that were activated when the enhanced content was originally are displayed as part of the audio video stream. If no enhanced content was displayed originally, the hot spots or links to the enhanced content are exposed to allow the viewer to select the enhanced content during replay if desired. In some embodiments of the present invention, the so-called transport type B mechanism may be utilized wherein the enhanced data is synchronized to the video. See Enhanced Content Specification, Advanced Television Enhancement Forum (available at www.atvef.com). However, the present invention may also be applied to the transport type A scenario wherein uniform resource locators (URLs) are provided to link to the enhanced data from the video information.

In some instances of the present invention, synchronization between the enhanced content and the video information may be provided with the transmission. A time code track may be utilized for providing identifiers to synchronize video and enhanced content. The time code may be provided in each of the packets of video and enhanced content data to provide synchronization in a given packet. The time code may then be utilized to control the separate multiplexing of video and enhanced content and its recombination as needed, for example, for display. Alternatively, the video packets and enhanced content packets may be parsed and separated but the time codes may be utilized to bring them back together for display.

Web browsers typically maintain a memory or disk-based cache of the most recently displayed Web pages and graphics. Thus, if each software key frame contained the entire contents of the browser cache, key frames may become very large. However, the Web browser need not cache a separate copy of the enhanced content or HTML object. Instead, since the original video plus enhanced content stream has been recorded, the Web browser may cache only a reference to the location of the HTML object or enhanced data in the previously recorded stream. Then there is no need to empty the Web browser's cache until the entire recorded program is removed from that storage.

The software key frame may be a snapshot of the local state variables of the browser rather than the entire contents of the browser cache in one embodiment of the invention. The browser state includes screen buffers, a stack and a heap. Thus, objects of the browser cache are not captured but instead references are captured, for example to time codes to provide offsets into the data stream to find the recorded information.

The video data may define a video frame or a plurality of video frames. Each video frame may be identified (if more than one video frame is involved) by a frame identifier. The frame identifier identifies each frame of a plurality of video frames which, for example, may make up a video presentation such as a movie, a television program, or a web site as examples.

One convenient frame identifier is the time code in accordance with one of a variety of industry standards including the Society of Motion Picture and Television Engineers (SMPTE). Conventionally, the time codes are utilized to enable synchronization between audio and video tracks. Another time code is the vertical interval time code (VITC). The VITC may be advantageous in some applications because it can be read even when the medium storing the video is paused.

The SMPTE time code is a broadcast standard time which may be recorded in the format HH:MM:SS;FF, where FF is a frame number between 00 and 29, HH is a two-digit code for hours, MM is a two-digit code for minutes and SS is a two-digit code for seconds. Assuming a frame rate of 30 frames per second, the SMPTE time code may identify every frame of a video sequence such as a movie, a television program or other video information.

While the present invention, in one embodiment, uses a time code to identify a given frame, the present invention is in no way limited to the use of time codes. The time code is simply a convenient way to identify one of a plurality of frames. Other techniques may also be utilized to identify each of the frames including simply providing each frame with a sequential identifier.

Figure 14:
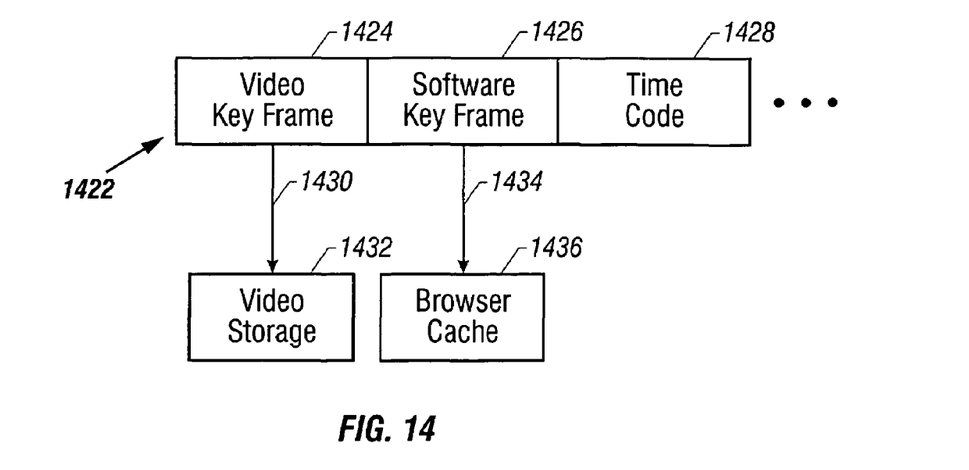
FIG. 14 is a schematic depiction of a data format that may be used in the embodiment shown in FIG. 11.

Thus, referring to FIG. 14, a packet 1422 with a video key frame 1444 and a software key frame 1426 may include a single time code 1428, in accordance with one embodiment of the present invention. The video key frame 1424 may be utilized to access the video storage 1432 as indicated at 1430. Similarly, the software key frame may be provided to reference, as indicated at 1434, the browser cache 1436 without requiring that the entire browser cache be stored. This saves unnecessary processing and preserves storage space.

Figure 15:
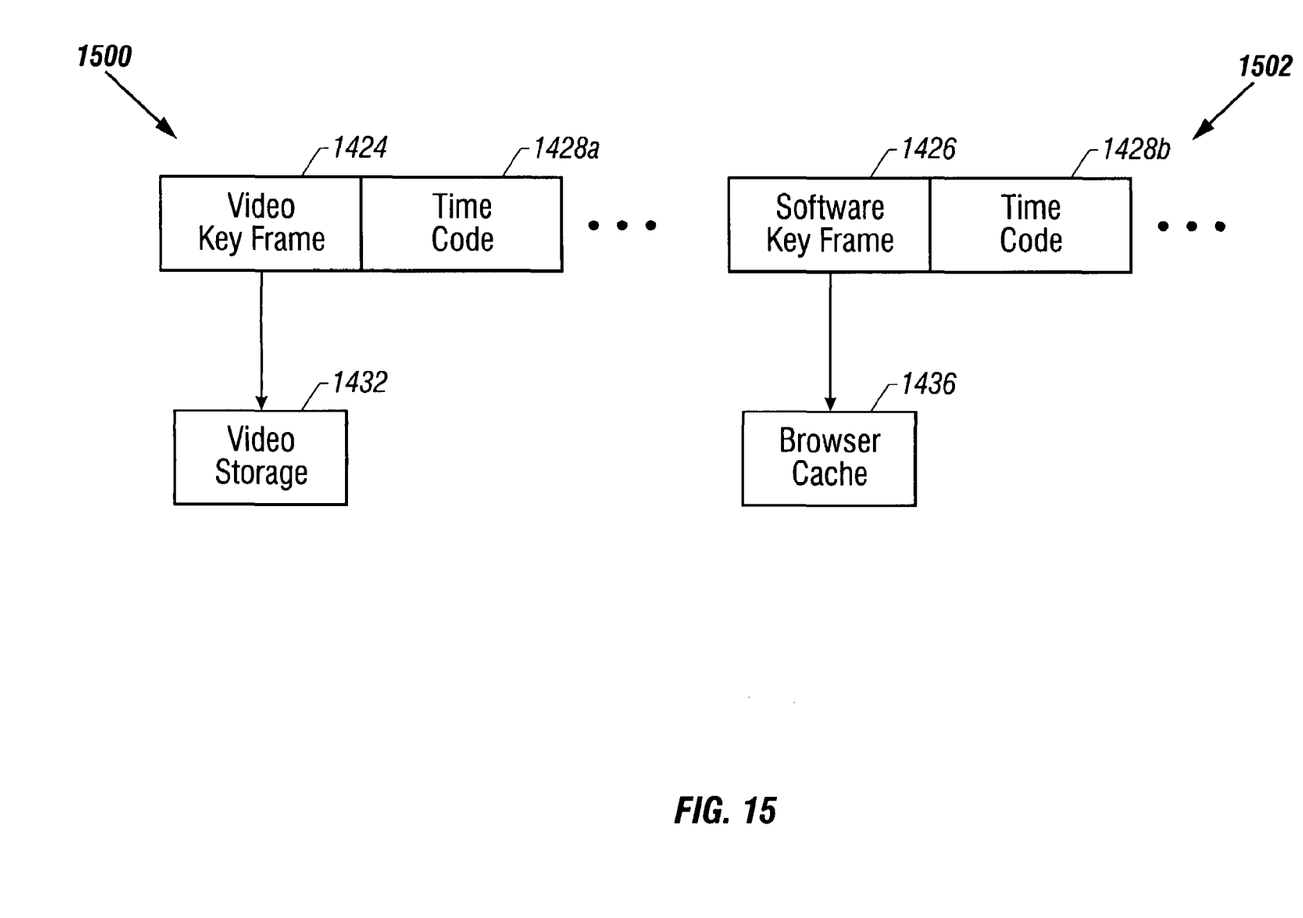
FIG. 15 is a schematic depiction of another data format that may be used with the embodiment of FIG. 11.

In accordance with another embodiment of the present invention, shown in FIG. 15, the time code 1428a may be associated with a video key frame 1424 as a single packet 1500. At the same time, a time code 1428b may be associated with a software key frame 1426 as a separate packet 1502. The video key frame may then be utilized to access the video storage 1432. The software key frame 1426 may be utilized to access the browser cache 1436. The time codes 1428a and 1428b may be the same in accordance with one embodiment of the present invention in order to enable the corresponding video key frame 1424 to be linked to the corresponding software key frame 1426, for example for replay. As a result, both the enhanced content and the video information may be replayed using a random access memory.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving video and enhanced content information including at least one identifier of web content associated with the video information;
   storing a copy of said associated web content during a broadcast of said video information to allow arbitrary access thereto after said broadcast, said copy remaining accessible even if said associated web content is unavailable;
   storing at least a portion of said received video information for subsequent playback after said broadcast;
   storing corresponding enhanced content information for subsequent access thereto after said broadcast, said storing configured to allow playback of said video information to be paused without losing synchronization between said video information and said copy of said web content; and
   during playback of said video information, displaying said associated web content if said associated web content was activated during an original display of said video information and displaying a link to said associated web content if said associated web content was not activated during the original display of said video information.

2. The method of claim 1 further including storing said enhanced content information in a random access memory.

3. The method of claim 1 wherein said associated web content changes during the broadcast, and said storing a copy including storing said changes to said associated web content so said changes are accessible during said subsequent playback.

4. The method of claim 1, the method further comprising:
   converting said associated web content into a packetized format in which at least a subset of said packets include time codes to facilitate synchronizing a current state of said web content with said playback of the video information.

5. The method of claim 4 including providing said time codes in each packet of said packetized web content.

6. The method of claim 4, further comprising:
   determining a data packet sequence, each of said packets in the sequence derived from at least one packet of said video information and at least one corresponding packet of said packetized associated web content.

7. The method of claim 1 including deriving a key frame from said enhanced content information.

8. The method of claim 7 including deriving a key frame which enables the enhanced content information to be replayed.

9. The method of claim 8 including storing the contents of a web browser buffer.

10. The method of claim 9 wherein deriving a key frame includes storing a pointer to the stored enhanced content information.

11. An article comprising a medium storing instructions executed by a computer system to perform:
   receive video and enhanced content information including at least one identifier of web content associated with the video information;
   storing a copy of said associated web content during a broadcast of said video information to allow arbitrary access thereto after said broadcast, said copy remaining accessible even if said associated web content is unavailable;
   storing at least a portion of said received video information for subsequent playback said broadcast;
   storing corresponding enhanced content information for subsequent access thereto after said broadcast, said storing configured to allow playback of said video information to be paused without losing synchronization between said video information and said associated web content; and
   during playback of said video information, displaying said associated web content if said associated web content was activated during an original display of said video information and displaying a link to said associated web content if said associated web content was not activated during the original display of said video information.

12. The article of claim 11 further storing instructions that cause a processor-based system to store said enhanced content information in a random access memory.

13. The article of claim 11 wherein said associated web content changes during the broadcast, and said instructions for performing the storing a copy including instructions for storing said changes to said associated web content so said changes are accessible during said subsequent playback.

14. The article of claim 11 further storing instructions to cause a processor-based system to perform converting said associated web content into a packetized format in which at least a subset of said packets include time codes to facilitate synchronizing a current state of said web content with said playback of the video information.

15. The article of claim 14 further storing instructions that cause a processor-based system to provide said time codes in each packet of said packetized web content.

16. The article of claim 14 further storing instructions to cause a processor-based system to perform determining a data packet sequence, each of said packets in the sequence derived from at least one packet of said video information and at least one corresponding packet of said packetized associated web content.

17. The article of claim 11 further storing instructions that cause a processor-based system to derive a software key frame from said enhanced content information.

18. The article of claim 17 further storing instructions that cause a processor-based system to derive a software key frame which enables enhanced content information to be replayed.

19. The article of claim 18 further storing instructions that cause a processor-based system to store the contents of a web browser buffer.

20. The article of claim 19 further storing instructions that cause a processor-based system to store a pointer to the stored enhanced content information.

21. A system comprising:
   a processor; and
   a random access memory, coupled to said processor, to store at least
      video information for subsequent playback after a broadcast of said video information,
      enhanced content including at least one identifier of web content associated with the video information, and
      a copy of the associated web content to allow arbitrary access thereto synchronized with replay of any portion of the video information, said copy remaining accessible even if originally associated web content is unavailable, and during the replay of the any portion of the video information, to display the associated web content if the associated web content was activated during an original display of the video information and to display a link to the associated web content if the associated web content was not activated during the original display of the video information.

22. The system of claim 21 wherein said associated web content changes during the broadcast, the system including storage coupled to said processor for storing at least said video information, said associated web content, and data to facilitate subsequent random access playback of said video information where said access results in a corresponding portion of said stored web content provided from the acquired copy.

23. The system of claim 22 wherein said program causes said enhanced content information to be stored as a software key frame.

24. The system of claim 23 wherein said program causes said processor to store the contents of a web browser buffer.

25. The system of claim 23 wherein said program causes a processor to derive a software key frame storing a pointer to the stored enhanced content information.

26. The system of claim 21 wherein said random access memory is a hard disk.

27. A method comprising:
receiving video and enhanced content information to at least identify web content associated with the video information;
storing a copy of said associated web content during a broadcast of said video information to allow arbitrary access thereto after said broadcast, said copy tracking changes in said associated web content during the broadcast and remaining available;
determining a synchronization data between the video content and the stored copy of the associated web content;
storing the video information and the determined synchronization data for subsequent synchronized playback after a broadcast of the video information, wherein the associated web content is retained for at least as long as the video information remains stored; and
during playback of the video information, displaying the associated web content if the associated web content was activated during an original display of the video information and displaying a link to the associated web content if the associated web content was not activated during the original display of the video information.

28. The method of claim 27, wherein determining the synchronization data comprises determining time codes for said associated web content to facilitate synchronizing said video information with said associated web content.

29. An apparatus comprising a machine accessible medium having associated data, which when accessed, results in a machine performing:
storing a copy of web content associated with video information during a broadcast of the video information to allow arbitrary access thereto after the broadcast, said copy tracking changes in said associated web content during the broadcast;
determining a synchronization data between the video information and the copy of the associated web content;
storing the video information and the determined synchronization data for subsequent synchronized playback after a broadcast of the video information, wherein the associated web content is retained for at least as long as the video information remains stored; and
during playback of the video information, displaying the associated web content if the associated web content was activated during an original display of the video information and displaying a link to the associated web content if the associated web content was not activated during the original display of the video information.

30. The apparatus of claim 29, wherein determining the synchronization data comprises determining time codes for said associated web content to facilitate synchronizing said video information with said associated web content.

* * * * *